(12) United States Patent
Lim et al.

(10) Patent No.: US 12,230,804 B2
(45) Date of Patent: Feb. 18, 2025

(54) METHOD OF MANUFACTURING AN ALL-SOLID-STATE BATTERY ELECTRODE AND AN ALL-SOLID-STATE BATTERY ELECTRODE MANUFACTURED THEREBY

(71) Applicants: HYUNDAI MOTOR COMPANY, Seoul (KR); KIA CORPORATION, Seoul (KR); KOREA ELECTRONICS TECHNOLOGY INSTITUTE, Seongnam-si (KR)

(72) Inventors: Jae Min Lim, Suwon-si (KR); Yong Gu Kim, Suwon-si (KR); Hong Seok Min, Yongin-si (KR); Sang Heon Lee, Yongin-si (KR); Sa Heum Kim, Suwon-si (KR); Yun Sung Kim, Seoul (KR); Ji Sang Yu, Seongnam-si (KR); Kyung Su Kim, Seongnam-si (KR); Goo Jin Jeong, Seongnam-si (KR); Woo Suk Cho, Seongnam-si (KR)

(73) Assignees: HYUNDAI MOTOR COMPANY, Seoul (KR); KIA CORPORATION, Seoul (KR); KOREA ELECTRONICS TECHNOLOGY INSTITUTE, Seongnam-si (KR)

( * ) Notice: Subject to any disclaimer, the term of this patent is extended or adjusted under 35 U.S.C. 154(b) by 310 days.

(21) Appl. No.: 17/544,605

(22) Filed: Dec. 7, 2021

(65) Prior Publication Data

US 2022/0393176 A1    Dec. 8, 2022

(30) Foreign Application Priority Data

May 25, 2021    (KR) .................... 10-2021-0066562

(51) Int. Cl.
| | | |
|---|---|---|
| *H01M 4/04* | (2006.01) | |
| *H01M 4/36* | (2006.01) | |
| *H01M 4/62* | (2006.01) | |

(52) U.S. Cl.
CPC ......... *H01M 4/623* (2013.01); *H01M 4/0416* (2013.01); *H01M 4/0435* (2013.01); *H01M 4/364* (2013.01)

(58) Field of Classification Search
None
See application file for complete search history.

(56) References Cited

U.S. PATENT DOCUMENTS

| | | | |
|---|---|---|---|
| 11,011,777 B2 | 5/2021 | Seong et al. | |
| 2014/0234724 A1* | 8/2014 | Nakamura | H01M 4/1393 264/105 |

(Continued)

FOREIGN PATENT DOCUMENTS

KR    20190079135 A    7/2019

*Primary Examiner* — Tracy M Dove
(74) *Attorney, Agent, or Firm* — Lempia Summerfield Katz LLC

(57) ABSTRACT

A method of manufacturing an all-solid-state battery electrode, an all-solid-state battery electrode manufactured by the method, and an all-solid-state battery including the electrode are disclosed. In the method, a specific type of binder included in the electrode is prepared in a fiber form by applying pressure to the binder under specific conditions, so that the fiber-form binder thus prepared has an average fineness that satisfies a specific range. Therefore, the all-solid-state battery including the electrode has an advantage of having high capacity even in the case of electrode thickening for high loading.

6 Claims, 6 Drawing Sheets

(56) References Cited

U.S. PATENT DOCUMENTS

| | | |
|---|---|---|
| 2017/0256367 A1* | 9/2017 | Raman .................. H01M 4/587 |
| 2019/0198917 A1 | 6/2019 | Seong et al. |
| 2019/0221832 A1* | 7/2019 | Wakasugi ......... H01M 10/0525 |
| 2020/0044257 A1* | 2/2020 | Koo .................... H01M 4/0404 |
| 2021/0273257 A1 | 9/2021 | Seong et al. |
| 2021/0273258 A1 | 9/2021 | Seong et al. |
| 2021/0280904 A1 | 9/2021 | Seong et al. |
| 2023/0108113 A1* | 4/2023 | Zhong .............. H01M 10/0562 429/304 |

* cited by examiner

METHOD OF MANUFACTURING AN ALL-SOLID-STATE BATTERY ELECTRODE AND AN ALL-SOLID-STATE BATTERY ELECTRODE MANUFACTURED THEREBY

CROSS REFERENCE TO RELATED APPLICATION

The present application claims priority to Korean Patent Application No. 10-2021-0066562, filed May 25, 2021, the entire contents of which are incorporated herein for all purposes by this reference.

BACKGROUND

Field of the Disclosure

The present disclosure relates to a method of manufacturing an all-solid-state battery electrode, an all-solid-state battery electrode manufactured by the method, and an all-solid-state battery including the electrode.

Description of the Related Art

As the need for electric vehicles and large-capacity power storage devices has increased, various batteries have been developed to satisfy this need.

Of these, lithium secondary batteries have been widely commercialized due to having the best energy density and output characteristics among various secondary batteries. As a lithium secondary battery, a lithium secondary battery (hereinafter referred to as a "liquid-type secondary battery") including a liquid electrolyte containing an organic solvent has been mainly used.

However, the liquid-type secondary battery has problems that decomposition of the liquid electrolyte due to electrode reaction causes the battery to expand and that there is a risk of ignition due to leakage of the liquid electrolyte. As a solution to such problems of the liquid-type secondary battery, a lithium secondary battery (hereinafter referred to as an "all-solid-state battery") employing the use of a solid-state electrolyte having excellent stability is attracting attention.

Meanwhile, solid-state electrolytes may be divided into oxide-based and sulfide-based solid-state electrolytes. Due to their high lithium ion conductivity compared to the oxide-based solid-state electrolytes and stability over a wide voltage range, the sulfide-based solid-state electrolytes are mainly used as the solid-state electrolytes.

Furthermore, in the case of manufacturing an electrode using a sulfide-based solid-state electrolyte, research on electrode thickening is being actively conducted in order to increase the loading amount of the electrode. However, it is difficult to realize thickening beyond a certain thickness and there is still a limit to realizing high energy density.

In addition, a secondary battery including the electrode thus manufactured is expected to be used in various fields. Accordingly, in order to increase the size of the secondary battery, a technology for forming an electrode in a large-area sheet form is essential.

The foregoing is intended merely to aid in understanding the background of the present disclosure and is not intended to mean that the present disclosure falls within the purview of the related art that is already known to those having ordinary skill in the art.

SUMMARY

Accordingly, the present disclosure has been made keeping in mind the above problems occurring in the related art and the specific objectives are as follows.

An objective of the present disclosure is to provide a method of manufacturing an all-solid-state battery electrode. The method includes applying pressure under specific conditions to a mixture in which a solid-state electrolyte, a binder, etc. are dispersed. The binder included therein is prepared in a fiber form.

Another objective of the present disclosure is to provide an all-solid-state battery electrode manufactured by the above method and including a specific type of binder having an average fineness that satisfies a specific range and to provide an all-solid-state battery including the same.

Objectives of the present disclosure are not limited to those mentioned above. The objectives of the present disclosure should become clearer from the following description and should be realized by means and combinations thereof described in the claims.

In order to achieve the above objectives, one aspect of the present disclosure provides a method of manufacturing an all-solid-state battery electrode. The method includes: preparing a mixture including a solid-state electrolyte, an active material, and a conductive material; adding a binder to the mixture so as to be dispersed therein; and applying pressure to the mixture in which the binder is dispersed to manufacture an electrode in a sheet form. The binder included in the sheet-form electrode may have a fiber form.

The mixture may include: 20 to 30% by weight of the solid electrolyte; 65 to 75% by weight of the active material; and 3 to 7% by weight of the conductive material.

The adding of the binder to the mixture may be performed by chopping up the binder so as to be uniformly dispersed in the mixture.

The binder may be added and dispersed in the mixture in an amount of 0.5 to 3.0 parts by weight, with respect to 100 parts by weight of the total mixture.

The binder may include polytetrafluoroethylene (PTFE).

The manufacturing of the electrode may be performed by applying pressure to the mixture in which the binder is dispersed with a roll press.

The applying of pressure to the mixture may be performed under a condition in which a press gap between rolls of the roll press is 0.8 to 2.8 mm.

The applying of pressure to the mixture may be performed under a condition in which a press count of the roll press is 55 to 145.

The method may further include roll-pressing the sheet-form electrode.

Another aspect of the present disclosure provides an all-solid-state battery electrode manufactured by the method. The all-solid-state battery electrode includes a solid-state electrolyte, an active material, a conductive material, and a binder, wherein the binder may have a fiber form.

The binder may have an average fineness of 20 to 50 nm.

Another aspect of the present disclosure provides an all-solid-state battery including the all-solid-state battery electrode, wherein the all-solid-state battery may have an electrode capacity of 170 to 230 mAh/g.

The method of manufacturing all-solid-state battery electrode according to the present disclosure can manufacture an electrode in a sheet form, so there is an advantage in that it is possible to realize a large-area electrode included in an all-solid-state battery.

In addition, in the method of manufacturing the all-solid-state battery electrode according to the present disclosure, a specific type of binder included in the electrode is prepared in a fiber form by applying pressure to the binder under specific conditions, so that the fiber-form binder thus prepared has an average fineness that satisfies a specific range. Therefore, the all-solid-state battery including the electrode has an advantage of having high capacity even in the case of electrode thickening for high loading.

Effects of the present disclosure are not limited to those mentioned above. It should be understood that the effects of the present disclosure include all effects that can be inferred from the following description.

BRIEF DESCRIPTION OF THE DRAWINGS

The above and other objectives, features, and other advantages of the present disclosure should be more clearly understood from the following detailed description when taken in conjunction with the accompanying drawings, in which.

DETAILED DESCRIPTION

Figure 1:
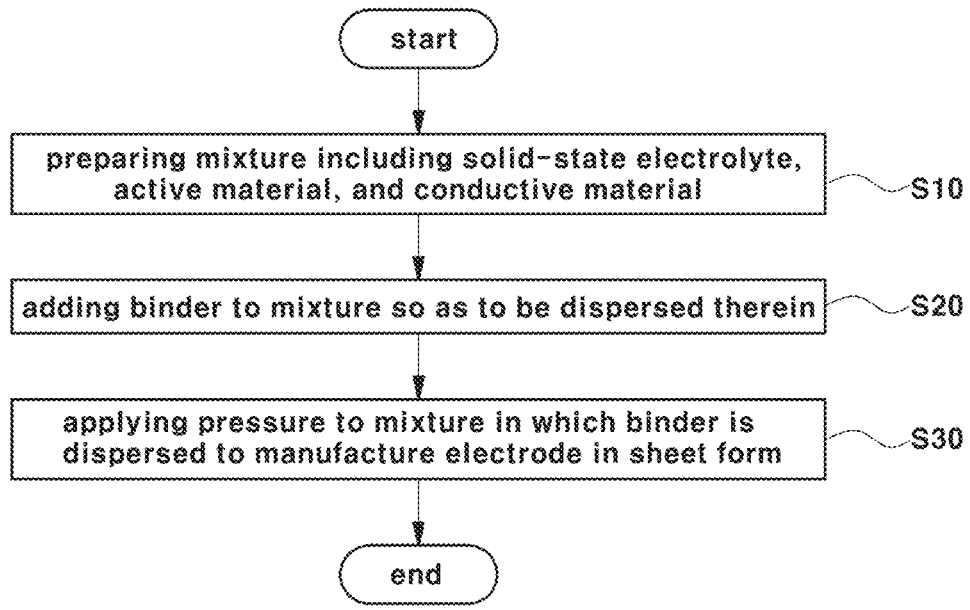
FIG. 1 is a flowchart schematically illustrating method of manufacturing an all-solid-state battery electrode according to the present disclosure.

The above and other objectives, features, and other advantages of the present disclosure should become apparent with reference to the following description of Examples. However, the present disclosure is not limited to embodiment disclosed herein but may be implemented in various forms. The embodiments are provided by way of examples only so that a person of ordinary skill in the art can fully understand the disclosures of the present disclosure and the scope of the present disclosure.

Like reference numerals refer to like components throughout the drawings. In the drawings, dimensions of structures are exaggerated for clarity.

It should be understood that the terms "comprise", "include", "have", etc. when used in this specification, specify the presence of stated features, integers, steps, operations, elements, components, and/or combinations of them but do not preclude the presence or addition of one or more other features, integers, steps, operations, elements, components, and/or combinations thereof. It should be further understood that when an element such as a layer, a film, a region, or a substrate is referred to as being "on" another element, it can be directly on the other element or intervening elements may also be present. In contrast, it should be understood that when an element such as a layer, a film, a region, or a substrate is referred to as being "under" another element, it can be directly under the other element or intervening elements may also be present.

All numbers, values and/or expressions referring to quantities of ingredients, reaction conditions, etc. used herein and in the claims appended hereto are subject to the various uncertainties of measurement encountered in obtaining such values. Thus, unless otherwise indicated, all of the above terms should be understood as modified in all instances by the term "about". Where a numerical range is disclosed herein such range is continuous, inclusive of both the minimum and maximum values of the range as well as every value between such minimum and maximum values. Still, further, where a range refers to integers, every integer between the minimum and maximum values of such range is included.

In this specification, where a range is stated for a parameter, it should be understood that the parameter includes all values within the stated range, inclusive of the stated endpoints of the range. For example, a range of "5 to 10" should be understood to include the values 5, 6, 7, 8, 9, and 10 as well as any sub-range within the stated range, so as to include the sub-range of 6 to 10, 7 to 10, 6 to 9, 7 to 9, etc. The range or "5 to 10" should be understood to include any value and range between the integers, which are reasonable in the context of the range stated, such as 5.5, 6.5, 7.5, 5.5 to 8.5 and 6.5 to 9, etc. For example, a range of "10% to 30%" should be understood to include the values 10%, 11%, 12%, 13%, etc. and all integers up to 30% as well as any sub-range within the stated range, such as to include the sub-range of 10% to 15%, 12% to 18%, 20% to 30%, etc., and inclusive of any value and range between the integers, which are reasonable in the context of the range stated, such as 10.5%, 15.5%, 25.5%, etc.

Conventional all-solid-state battery electrodes have disadvantages that it is difficult to increase the area of the electrodes and that there is a limit to thickening the electrodes for realizing high energy density.

Accordingly, as a result of having made an intensive study to solve the above problems, the present inventors have found that when an electrode for an all-solid-state battery is manufactured by applying pressure to a specific type of binder under specific conditions, the binder included in the electrode has an average fineness that satisfies a specific range. As a result, an all-solid-state battery including the electrode manufactured therefrom has high capacity even in the case of electrode thickening for high loading. Therefore, the present disclosure is completed below.

FIG. 1 is a flowchart schematically illustrating method of manufacturing an all-solid-state battery electrode according to the present disclosure. Referring to this, the method of manufacturing the all-solid-state battery electrode includes: preparing a mixture including a solid-state electrolyte, an active material, and a conductive material (S10); adding a binder to the mixture so as to be dispersed therein (S20); and applying pressure to the mixture in which the binder is dispersed to manufacture an electrode in a sheet form (S30).

The method is described for each step.

The preparing of the mixture is a step of preparing the mixture by adding the solid-state electrolyte, the active material, and the conductive material, which are materials necessary for manufacturing an all-solid-state battery electrode, and then mixing the same.

The solid-state electrolyte is a component responsible for lithium ion conduction of an electrode including the solid-state electrolyte and may be a sulfide-based solid-state electrolyte or an oxide-based solid-state electrolyte.

In an embodiment, the solid-state electrolyte is a solid-state electrolyte according to Chemical Formula 1 below.

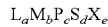    [Chemical Formula 1]

(In the above Chemical Formula 1, L is at least one element selected from the group consisting of alkali metals; M is at least one element selected from the group consisting of B, Al, Ga, In, Si, Ge, Sn, Pb, As, Sb, Bi, Ti, V, Mn, Fe, Co, Ni, Cu, Y, Zr Nb, Mo, Tc, Ru, Rh, Pd, Ag, Hf, Ta, or W; X is one element selected from the group consisting of F, Cl, Br, I, or O; $0 \le a \le 12$, $0 \le b \le 6$, $0 \le c \le 6$, $0 \le d \le 12$, and $0 \le e \le 9$).

In another embodiment, the solid-state electrolyte may include at least one selected from the group consisting of $Li_6PS_5Cl$, $Li_2S-P_2S_5$, $Li_2S-P_2S_5-LiI$, $Li_2S-P_2S_5-LiCl$, $Li_2S-P_2S_5-LiBr$, $Li_2S-P_2S_5-Li_2O$, $Li_2S-P_2S_5-Li_2O-LiI$, $Li_2S-SiS_2$, $Li_2S-SiS_2-LiI$, $Li_2S-SiS_2-LiBr$, $Li_2S-SiS_2-LiCl$, $Li_2S-SiS_2-B_2S_3-LiI$, $Li_2-SiS_2-P_2S_5-LiI$, $Li_2S-B_2S_3$, $Li_2S-P_2S_5-Z_mS_n$ (where m and n are positive numbers and Z is one of Ge, Zn, or Ga), $Li_2S-GeS_2$, $Li_2S-SiS_2-Li_3PO_4$, $Li_2S-SiS_2-Li_xMo_y$ (where x and y are positive numbers and M is one of P, Si, Ge, B, Al, Ga, or In), $Li_{10}GeP_2S_{12}$, or the like.

The active material may be a cathode active material or an anode active material.

When the active material is the cathode active material, the cathode active material may be an oxide active material or a sulfide active material. When the cathode active material is the oxide active material, the oxide active material may be a layered rock-salt type active material such as $LiNi_{0.7}Co_{0.15}Mn_{0.15}O_2$, $LiCoO_2$, $LiMnO_2$, $LiNiO_2$, $LiVO_2$, or $Li_{1+x}Ni_{1/3}Co_{1/3}Mn_{1/3}O_2$. The oxide active material may also be a spinel-type active material such as $LiMn_2O_4$ or $Li(Ni_{0.5}Mn_{1.5})O_4$, an inverse spinel-type active material such as $LiNiVO_4$ or $LiCoVO_4$, an olivine-type active material such as $LiFePO_4$, $LiMnPO_4$, $LiCoPO_4$, or $LiNiPO_4$, or a silicon-containing active material such as $Li_2FeSiO_4$ or $Li_2MnSiO_4$. The oxide active material may also be a layered rock-salt type active material in which a part of transition metal is substituted with a dissimilar metal, such as $LiNi_{0.8}Co_{(0.2-x)}Al_xO_2$ (where $0<x<0.2$), a spinel-type active material in which a part of transition metal is substituted with a dissimilar metal, such as $Li_{1+x}Mn_{2-x-y}M_yO_4$ (where M is at least one of Al, Mg, Co, Fe, Ni, or Zn and $0<x+y<2$); or lithium titanate such as $Li_4Ti_5O_{12}$. On the other hand, when the cathode active material is the sulfide active material, the sulfide active material may be copper chevrel, iron sulfide, cobalt sulfide, nickel sulfide, or the like or may include only a specific component.

In the case of the anode active material, a carbon material such as natural graphite, artificial graphite, graphite carbon fiber, or resinous carbon, or an alloy-based material compounded with a solid-state electrolyte may be used. Examples of the alloy-based material include lithium alloy (LiAl, LiZn, $Li_3Bi$, $Li_3Cd$, $Li_3Sb$, $Li_4Si$, $Li_{4.4}Pb$, $Li_{4.4}Sn$, $Li_{0.17}C$, $LiC_6$, or the like), lithium titanate ($Li_4Ti_5O_{12}$) and metal oxide such as Zn.

The conductive material may be a component responsible for electrical conduction of an electrode including the conductive material and may be carbon black, conductive graphite, ethylene black, graphene, or the like.

The solid-state electrolyte, active material, and conductive material that may include the above components may be included in the mixture in an amount of 20 to 30% by weight of the solid-state electrolyte, 65 to 75% by weight of the active material, and 3 to 7% by weight of the conductive material. When the amount of the solid-state electrolyte is too small, insufficient ion conductivity results in limiting lithium migration and making it difficult to realize a desired capacity. On the other hand, when the amount thereof is too large, the amount of the active material is decreased and thus energy density is decreased. In addition, when the amount of the active material is too small, energy density is decreased. On the other hand, when the amount thereof is too large, the amount ratio of the electrolyte and the conductive material is relatively decreased. As a result, lithium migration is limited and resistance is increased. In addition, when the amount of the conductive material is too small, insufficient electrical conductivity increases cell resistance. On the other hand, when the amount thereof is too large, the amount of the active material is decreases and thus energy density is decreased and dispersion is difficult during wet mixing.

The solid-state electrolyte, the active material, and the conductive material may be added, followed by mixing to be uniformly dispersed, thereby preparing the mixture. At this time, the mixing may be performed using a general physical mixing process that can be used in the present disclosure, e.g., using a homogenizer, a ball mill, a planetary mill, a resonant acoustic mixer, a bead mill, a planetary despa (PD) mixer, or the like.

The adding of the binder to the mixture so as to be dispersed therein (S20) is a step of adding the binder and a solvent to the prepared mixture to prepare a mixture in which the binder is uniformly dispersed.

The solvent may include a solvent that can be added to allow the uniformly dispersed mixture to be subsequently kneaded and prepared in a clay form, e.g., at least one selected from the group consisting of decane, sulfonic acid, or a butyrate-based solvent (n-butyl butyrate, hexyl butyrate, or the like).

The binder may include a specific binder that can be applied to a process of thickening an electrode to equal to or greater than a certain thickness for realizing high loading during manufacturing of the electrode, e.g., at least one selected from the group consisting of polytetrafluoroethylene (PTFE), ethylene tetrafluoroethyiene (ETFE), polyvinylidene fluoride (PVDF), or fluorine-based rubber. In an embodiment, the binder includes, but is not limited to, polytetrafluoroethylene (PTTE).

The binder may be added and dispersed in the mixture in an amount of 0.5 to 3.0 parts by weight, with respect to 100 parts by weight of the total mixture. When the amount of the binder is too small, low formability makes it difficult to manufacture a uniform clay-type electrode. On the other hand, when the amount thereof is too large, the binder is not controlled in fineness but becomes agglomerated and thus resistance of the electrodes increased.

When the solvent and the binder are added to the mixture, the added binder may be chopped up through a mixing process and uniformly dispersed in the mixture. When the binder is chopped up and dispersed, this makes it possible to uniformly form a dry electrode.

The mixing process is a process that can satisfy the above characteristics and may be performed using a general physical mixing process that can be used in the present disclosure, e.g., using a blade mixer, a homogenizer, a ball mill, a planetary mill, a resonant acoustic mixer, a bead mill, a planetary despa (PD) mixer, or the like.

In addition, before applying pressure to the mixture in which the binder is dispersed through the mixing process, the method may further include kneading the mixture into a mixture in a clay form. This may be a final preparation process for manufacturing a sheet-form electrode.

The manufacturing of the electrode in a sheet form (S30) is a step of applying pressure to the clay-form mixture in which the binder is dispersed to finally manufacture the sheet-form electrode.

The applying of pressure to the mixture to manufacture the sheet-form electrode may be performed using a pressing method that can be used to manufacture a sheet-form electrode, e.g., at least one pressing method selected from the group consisting of a roll-pressing method or a uniaxial hydraulic pressing method. In an embodiment, the applying of pressure to the mixture is performed using, but is not limited to, a roll-pressing method that is easy to achieve a target thickness uniformly through gap adjustment and advantageous for realizing a large area and continuous process.

In the method of manufacturing the all-solid-state battery electrode according to the present disclosure, in order to solve the problem of the related art in which it is difficult to thicken the electrode so as to have high loading for realization of high energy density, it is possible to manufacture the sheet-form electrode by, as well as by using a specific type of binder, performing pressing under a specific pressure condition, such as a press gap of a roll press and a press count of the roll press.

When the sheet-form electrode is manufactured by the roll-pressing method, the press gap between rolls may be 0.8 to 2.8 mm or 0.8 to 2.0 mm. When the press cap between the rolls is too small, density is increased. As a result, a formed body loses its ductility and becomes hard and brittle. On the other hand, when the press gap therebetween is too large, density is decreased and thus it is difficult to achieve fiberization of the binder. Therefore, it is difficult to maintain the shape of the formed body.

In addition, the press count of the roll press may be 55 to 145 or 55 to 110. When the press count is too small, fiberization of the binder is not sufficiently achieved and thus the formed body becomes easy to tear or damage. Therefore, it is difficult to maintain the shape of the formed body. On the other hand, when the press count is too large, the formed body loses its ductility and becomes hard and brittle.

In addition, after manufacturing the electrode in a sheet form under a roll press pressure that satisfies the above conditions, the method may further include roll-pressing the sheet-form electrode.

Specifically, the roll-pressing of the sheet-form electrode may include performing at least one of additional pressing or final pressing to manufacture a sheet-form final electrode.

The additional pressing may be performed under a condition in which the press count is about one to four and the press gap is about 0.5 to 3 mm.

The final pressing may be performed under a condition in which the press count is about one and the press gap is about 245 to 255 µm or 250 µm.

Figure 2:
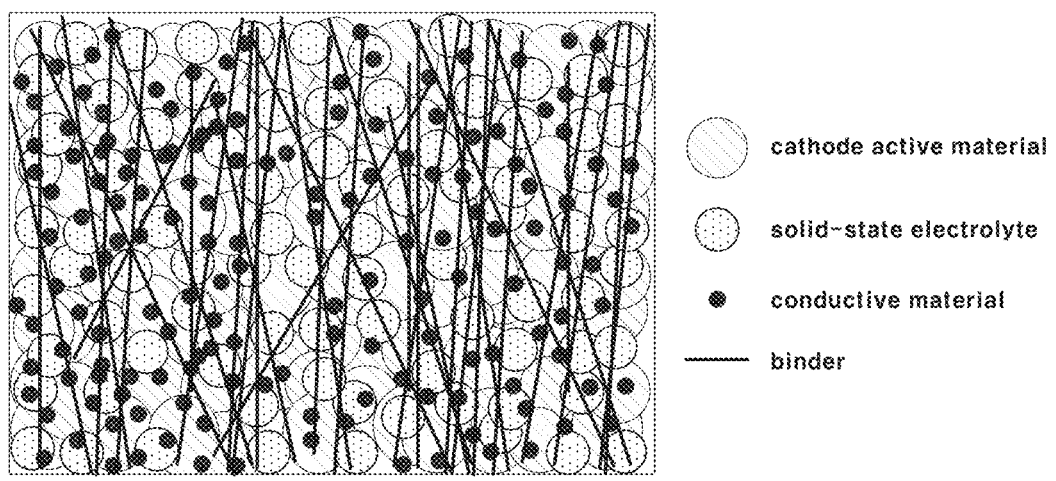
FIG. 2 is a sectional view schematically illustrating an all-solid-state battery electrode manufactured according to the present disclosure.

FIG. 2 is a sectional view schematically illustrating an all-solid-state battery electrode manufactured according to the present disclosure. Referring to this, the all-solid-state battery electrode according to the present disclosure is manufactured according to the above method and includes a solid-state electrolyte, an active material, a conductive material, and a binder. Herein, the binder is a fibrous binder in a network form.

In an embodiment, the binder has an average fineness of 20 to 50 nm or 30 to 40 nm. When the average fineness of the binder is too small, hardening occurs and the binder network is broken. As a result, the electrode exhibits non-uniform mechanical properties. On the other hand, when the average fineness thereof is too large, the binder does not spread uniformly and thus does not hold all the particles. As a result, the electrode exhibits non-uniform mechanical properties and has a large deviation in electrochemical resistance.

An all-solid-state battery according to the present disclosure includes the all-solid-state battery electrode that satisfies the above characteristics.

In other words, in the method of manufacturing the all-solid-state battery electrode according to the present disclosure, a specific type of binder included in the electrode is prepared in a fiber form by applying pressure to the binder under specific conditions, so that the fiber form binder prepared therefrom has an average fineness that satisfies a specific range. Therefore, an all-solid-state battery including the electrode has an advantage of having a high capacity of about 170 to 230 mAh/g even in the case of electrode thickening for high loading.

The present disclosure is described in more detail with reference to the following examples. The following examples are only examples to help the understanding of the present disclosure and the scope of the present disclosure is not limited thereto.

Examples and Comparative Examples 1 to 5:
Preparation of All-Solid-State Battery Electrode The following manufacturing method was performed in a dry room atmosphere in which moisture was controlled, e.g., in a glove box atmosphere. A specific manufacturing method is as follows.

(S10) A mixture was prepared using $LiNi_{0.7}Co_{0.15}Mn_{0.15}O_2$ as an active material, $Li_6PS_5Cl$ as a solid-state electrolyte, and Super-C as a conductive material. Specifically, based on 5 g of the mixture, 70% of the active material, 25% of the solid-state electrolyte, and 5% of the conductive material were mixed to be uniformly dispersed to prepare the mixture.

(S20) With respect to 100 parts by weight of the mixture, 1 part by weight of binder powder and 1.2 µL of decane as a solvent were added to the mixture, then PTFE as a binder was chopped up and dispersed using a blade mixer, and finally, a mixture in which PTFE is dispersed was obtained. Then, the mixture in which the PTFE is dispersed was added to a mortar and kneaded to prepare a dough (clay)-form mixture.

(S30) Shearing stress was applied to the dough (clay)-form mixture using a roll press Co prepare a sheet-form electrode. Here, pressing conditions according to Examples and Comparative Examples 1 to 5 are as illustrated in Table 1 below. Thereafter, the electrode thus prepared was subjected to the processes of additional pressing and final pressing to manufacture a sheet-form final all-solid-state battery electrode.

TABLE 1

| Classification | Pressing (press gap/count) | Additional pressing (press gap/count) | | | Final pressing (press gap) |
|---|---|---|---|---|---|
| Comparative Example 1 | 2.8 mm (100) | 2 mm (1) | 1.3 mm (1) | 0.8 mm (1) | 250 μm |
| Comparative Example 2 | 1.3 mm (100) | 0.8 mm (1) | — | — | 250 μm |
| Example 1 | 2 mm (100) | 1.3 mm (1) | 0.8 mm (1) | — | 250 μm |
| Comparative Example 3 | 2 mm (50) | 2 mm (1) | 1.3 mm (1) | 0.8 mm (1) | 250 μm |
| Comparative Example 4 | 2 mm (150) | 2 mm (1) | 1.3 mm (1) | 0.8 mm (1) | 250 μm |
| Comparative Example 5 | 2 mm (250) | 2 mm (1) | 1.3 mm (1) | 0.8 mm (1) | 250 μm |

Experimental Example 1: All-Solid-State Battery Electrodes According to Difference in Press Gap and Comparison of Performance of all-Solid-State Batteries Including Same All-solid-state battery electrodes were manufactured according to the above Example, Comparative Example 1, and Comparative Example 2, the inside of each of the electrodes was is analyzed, and the result was illustrated as a scanning electron microscope (SEM) image.

Figure 3A:
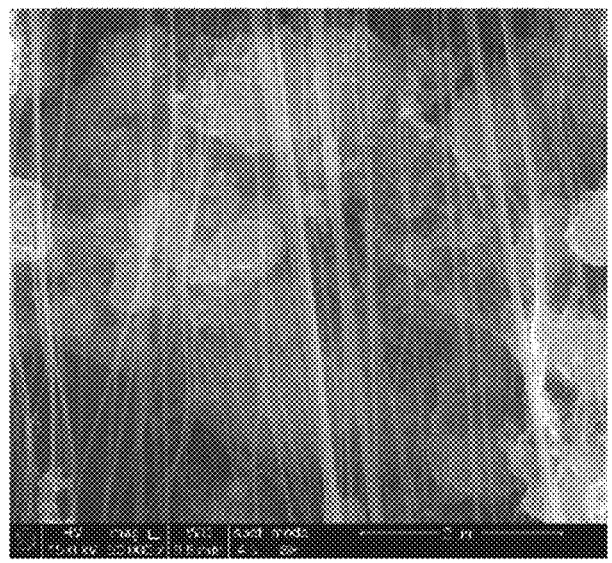
FIG. 3A is a scanning electron microscope (SEM) image of the inside of an all-solid-state battery electrode manufactured according to Example.
Figure 3B:
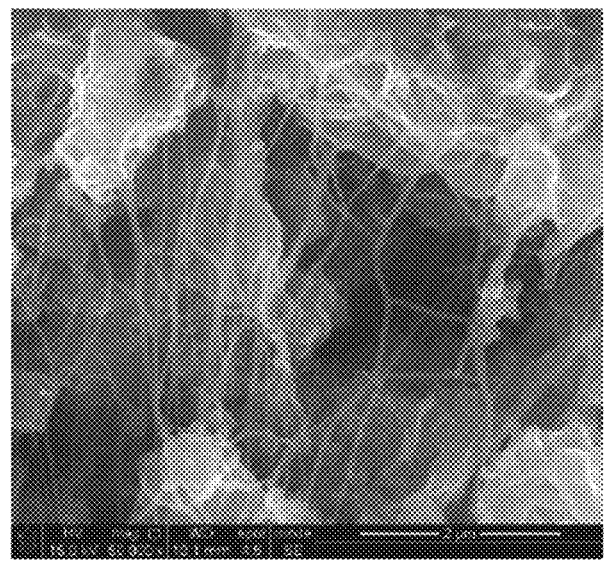
FIG. 3B is an SEM image of the inside of an all-solid-state battery electrode manufactured according to Comparative Example 1.
Figure 3C:
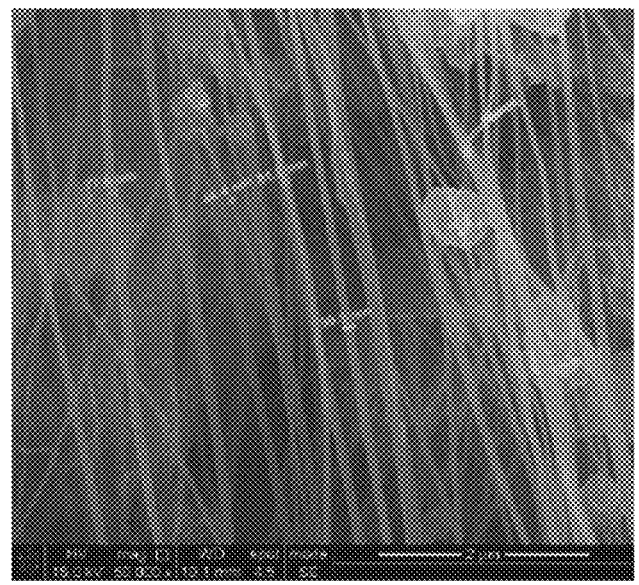
FIG. 3C is an SEM image of the inside of an all-solid-state battery electrode manufactured according to Comparative Example 2.

Specifically, FIG. 3A is an SEM image of the inside of an all-solid-state battery electrode manufactured according to Example. FIG. 3B is an SEM image of the inside of an all-solid-state battery electrode manufactured according to Comparative Example 1. FIG. 3C is an SEE image of the inside of an all-solid-state battery electrode manufactured according to Comparative Example 2.

Referring to FIG. 3A, a binder in the electrode manufactured according to the Example has a fiber form and has a small fineness of 30 to 40 nm, so it was confirmed from this that the binder is included in a network form.

On the other hand, referring to FIG. 3B, it was confirmed that the electrode according to Comparative Example 1 manufactured under the condition of increasing the press gap during pressing includes a binder having low linear processability. Referring to FIG. 3C, it was confirmed that the electrode according to Comparative Example 2 manufactured under the condition of decreasing the press gap during pressing includes a binder having a relatively large fineness of 70 to 90 nm compared to Example.

Meanwhile, in order to compare the performance of all-solid-state batteries including the electrodes, all-solid-state batteries were each manufactured by a manufacturing method using uniaxial hydraulic pressing, in which each of the electrodes according to the Example, Comparative Example 1, and Comparative Example 2 was used as a positive electrode, Li—In was used as a negative electrode, and an argyrodite-based solid-state electrolyte was used as a solid-state electrolyte layer. Then, the all-solid-state batteries manufactured therefrom were initially charged and discharged under the conditions of 0.05 C and 25° C. and the results are illustrated in FIG. 4 and Table 2.

Figure 4:
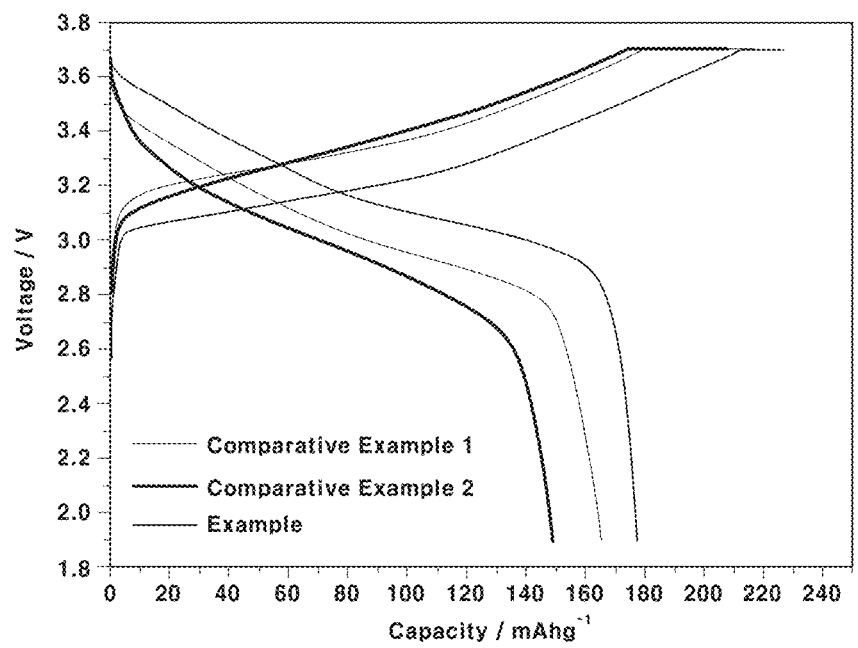
FIG. 4 is a graph illustrating initial charge/discharge curves of an all-solid-state battery including the electrode according to Example, an all-solid-state battery including the electrode according to Comparative Example 1, and an all-solid-state battery including the electrode according to Comparative Example 2.

Specifically, FIG. 4 is a graph illustrating initial charge/discharge curves of an all-solid-state battery including the electrode according to the Example, an all-solid-state battery including the electrode according to Comparative Example 1, and an all-solid-state battery including the electrode according to Comparative Example 2.

TABLE 2

| | Capacity (mAh/g) | | |
|---|---|---|---|
| Classification | Charge | Discharge | Efficiency (%) |
| Comparative Example 1 | 217.24 | 165.52 | 76.19 |
| Comparative Example 2 | 207.90 | 149.06 | 71.70 |
| Example | 226.48 | 177.43 | 78.34 |

Example, Comparative Example 1, and Comparative Example 2 respectively represent the all-solid-state battery including the electrode according to the Example, the all-solid-state battery including the electrode according to Comparative Example 1, and the all-solid-state battery including the electrode according to Comparative Example 2. Referring to FIG. 4 and Table 2, it was confirmed that the all-solid-state battery (the Example) including the electrode manufactured according to the present disclosure has a high charge/discharge capacity and a relatively high efficiency.

On the other hand, in the case of the all-solid-state battery (Comparative Example 1) including the electrode manufactured under the condition of increasing the press gap so that a binder in the electrode has low linear processability and in the case of the all-solid-state battery (Comparative Example 2) including the electrode manufactured under the condition of decreasing the press gap so that a binder in the electrode has a relatively large fineness of 70 to 90 nm, it was confirmed that charging and discharging capacity, is low and efficiency is also relatively low compared to the all-solid-state battery according to Example.

In other words, in the method of manufacturing the all-solid-state battery electrode according to the present disclosure, when applying pressure under a specific condition in which the press gap is in the range of 0.8 to 2.8 cm, the binder included in the electrode thus manufactured has a fiber form and has an average fineness that satisfies a specific range. Therefore, the all-solid-state battery including the electrode has an advantage of having high capacity even in the case of electrode thickening for high loading.

Experimental Example 12: All-Solid-State Battery Electrodes According to Press Count and Comparison of Performance of All-Solid-State Batteries Including Same All-solid-state battery electrodes were manufactured according to Example and Comparative Examples 3-5, the inside of each of the electrodes was analyzed and the result was illustrated as an SEM image.

Figure 5A:
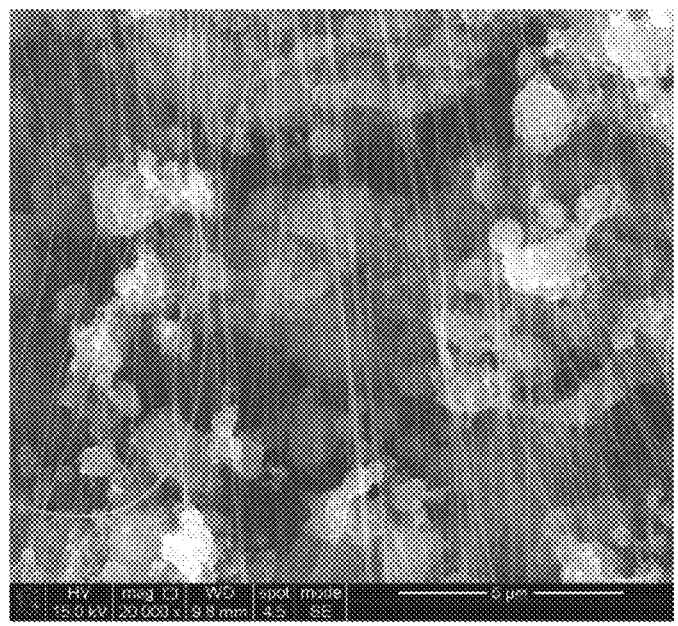
FIG. 5A is an SEM image of the inside of an all-solid-state battery electrode manufactured according to Example.
Figure 5B:
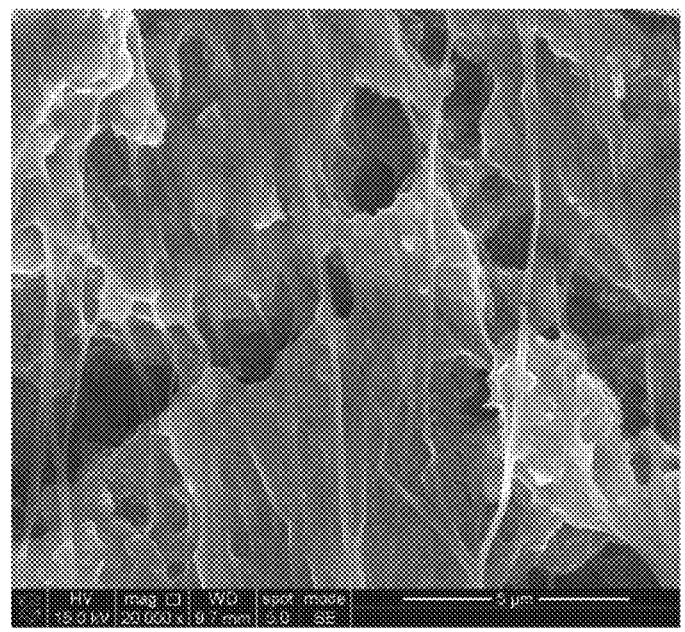
FIG. 5B is an SEM image of the inside of an all-solid-state battery electrode manufactured according to Comparative Example 3.
Figure 5C:
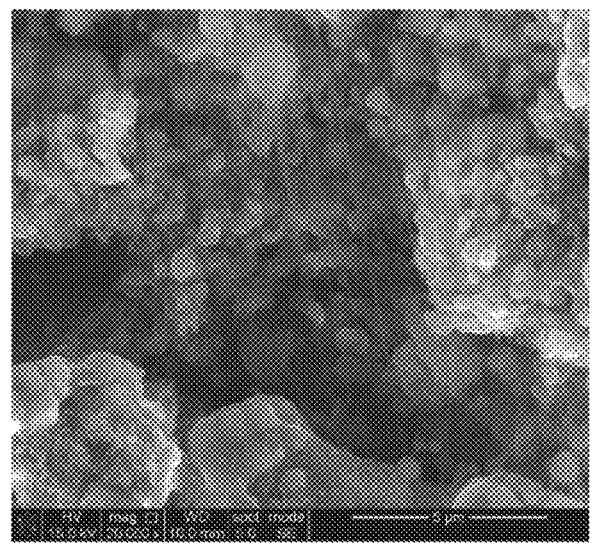
FIG. 5C is an SEM image of the inside of an all-solid-state battery electrode manufactured according to Comparative Example 4.
Figure 5D:
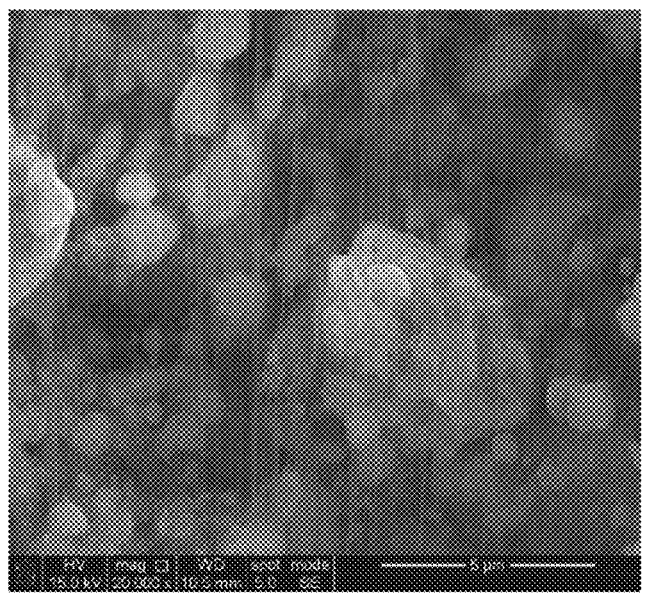
FIG. 5D is an SEM image of the inside of an all-solid-state battery electrode manufactured according to Comparative Example 5.

FIG. 5A is an SEM image of the inside of an all-solid-state battery electrode manufactured according to Example. FIG. 5B is an SEM image of the inside of an all-solid-state battery electrode manufactured according to Comparative Example 3. FIG. 5C is an SEM image of the inside of an all-solid-state battery electrode manufactured according to Comparative Example 4. FIG. 5D is an SEM image of the inside of an all-solid-state battery electrode manufactured according to Comparative Example 5.

Referring to FIG. 5A, a binder in the electrode manufactured according to the Example has a fiber form and has a small fineness of 30 to 40 nm, so it was confirmed from this that binder is included in a network form.

On the other hand, referring to FIGS. 5B, 5C, and 5D, it was confirmed that in the case of the electrode according to Comparative Example 4 manufactured under the condition of decreasing the press count, a binder in the electrode has low linear processability. It was also confirmed that in the case of the electrode according to Comparative Example 2 manufactured under the condition of increasing the press count, a binder in the electrode has a decreased fineness. As a result, hardening occurs and a broken binder network is observed.

Meanwhile, in order to compare the performance of all-solid-state batteries including the electrodes, all-solid-state batteries were each manufactured by a manufacturing method using uniaxial hydraulic pressing, in which each of the electrodes according to the Example and Comparative Examples 3-5 was used as a positive electrode, Li—In was used as a negative electrode, and an argyrodite-based solid-state electrolyte was used as a solid-state electrolyte layer. Then, the all-solid-state batteries thus manufactured were initially charged and discharged under the conditions of 0.05 C and 25° C. and the results are illustrated in FIG. 6 and Table 3.

Figure 6:
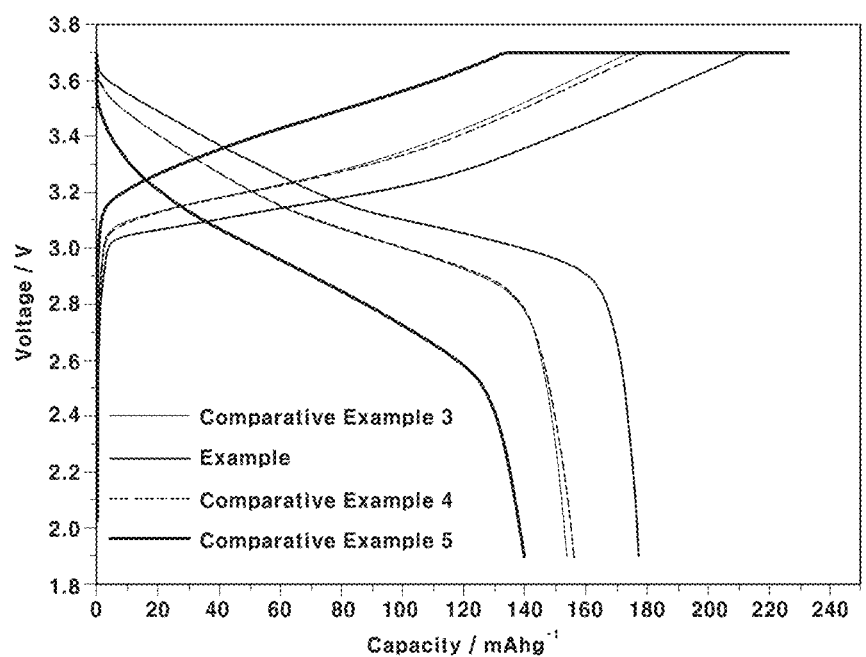
FIG. 6 is a graph illustrating initial charge/discharge curves of an all-solid-state battery including the electrode according to Example and all-solid-state batteries including the electrodes according to Comparative Examples 3 to 5.

Specifically, FIG. 6 is a graph illustrating initial charge/discharge curves of an all-solid-state battery including the electrode according to the Example and all-solid-state batteries including the electrodes according to Comparative Examples 3 to 5.

TABLE 3

| Classification | Capacity (mAh/g) | | Efficiency (%) |
| --- | --- | --- | --- |
| | Charge | Discharge | |
| Comparative Example 3 | 204.85 | 153.86 | 75.11 |
| Example | 226.48 | 177.43 | 78.34 |
| Comparative Example 4 | 215.12 | 156.06 | 72.55 |
| Comparative Example 5 | 207.42 | 139.99 | 67.49 |

The Example and Comparative Examples 3-5 respectively represent the all-solid-state battery including the electrode according to the Example and the all-solid-state batteries including the electrodes according to Comparative Examples 3 to 5. Referring to FIG. 6 and Table 3, it was confirmed that the all-solid-state battery (the Example) including the electrode manufactured according to the present disclosure has a high charge/discharge capacity and a relatively high efficiency.

On the other hand, in the case of the all-solid-state battery (Comparative Example 3) including the electrode manufactured under the condition of decreasing the press count so that a binder included in the electrode has low linear processability and in the case of the all-solid-state batteries (Comparative Examples 4 and 5) including the electrodes manufactured under the condition of increasing the press count so that a binder included in each of the electrodes has small fineness, it was confirmed that charging and discharging capacity is low and efficiency is also relatively low compared to the all-solid-state battery according to Example.

In other words, in the method of manufacturing the all-solid-state battery electrode according to the present disclosure, when applying pressure under a specific condition in which the press count is in the range of 55 to 145, the binder included in the electrode manufactured therefrom has a fiber form and has an average fineness that satisfies a specific range. Therefore, the all-solid-state battery including the electrode has an advantage of having high capacity even in the case of electrode thickening for high loading.

What is claimed is:

1. A method of manufacturing an all-solid-state battery electrode, the method comprising:
   preparing a mixture comprising a solid-state electrolyte, an active material, and a conductive material;
   adding a binder to the mixture so as to be dispersed therein; and
   primarily roll-pressing to the mixture in which the binder is dispersed to manufacture a sheet-form electrode as the all-solid-state battery electrode,
   wherein the binder included in the sheet-form electrode has a fiber form,
   wherein the binder having the fiber form has an average fineness of 20 to 50 nm,
   wherein the primarily roll-pressing is performed under a condition in which a press count is 55 to 145,
   wherein the primarily roll-pressing is performed under a condition in which a press gap between rolls is 0.8 to 2.0 mm,
   wherein the method further comprises:
   additionally roll-pressing the sheet-form electrode on which the primarily roll-pressing is performed, under a condition in which a press gap of the additionally roll-pressing is smaller than the press gap of the primarily roll-pressing,
   wherein the additionally roll-pressing is performed multiple times.

2. The method of claim 1, wherein the mixture comprises: 20 to 30% by weight of the solid electrolyte; 65 to 75% by weight of the active material; and 3 to 7% by weight of the conductive material.

3. The method of claim 1, wherein the adding of the binder to the mixture is performed by chopping up the binder so as to be uniformly dispersed in the mixture.

4. The method of claim 1, wherein the binder is added and dispersed in the mixture in an amount of 0.5 to 3.0 parts by weight, with respect to 100 parts by weight of the mixture.

5. The method of claim 1, wherein the binder comprises polytetrafluoroethylene (PTFE).

6. The method of claim 1, wherein the additionally roll-pressing comprises:
   secondarily roll-pressing the sheet-form electrode on which the primarily roll-pressing is performed, under a condition in which a press gap of the secondarily roll-pressing is smaller than the press gap of the primarily roll-pressing,
   tertiarily roll-pressing the sheet-form electrode on which the secondarily roll-pressing is performed, under a condition in which a press gap of the tertiarily roll-pressing is smaller than the press gap of the secondarily roll-pressing.

\* \* \* \* \*